(12) United States Patent
Golembiowski

(10) Patent No.: US 8,737,759 B2
(45) Date of Patent: May 27, 2014

(54) IMAGE BLURRING BY PARTITIONING A NON-SEPARABLE FIR FILTER

(75) Inventor: Albert Golembiowski, Santa Monica, CA (US)

(73) Assignee: Intel Corporation, Santa Clara, CA (US)

(*) Notice: Subject to any disclaimer, the term of this patent is extended or adjusted under 35 U.S.C. 154(b) by 311 days.

(21) Appl. No.: 13/175,391

(22) Filed: Jul. 1, 2011

(65) Prior Publication Data

US 2013/0004097 A1    Jan. 3, 2013

(51) Int. Cl.
*G06K 9/40* (2006.01)

(52) U.S. Cl.
USPC .......................................................... 382/264

(58) Field of Classification Search
USPC ................. 324/76.28; 379/390.02; 382/264
See application file for complete search history.

(56) References Cited

U.S. PATENT DOCUMENTS

| | | | |
|---|---|---|---|
| 2004/0158594 A1* | 8/2004 | Acharya | 708/444 |
| 2005/0182803 A1* | 8/2005 | Claassen et al. | 708/300 |
| 2008/0151308 A1* | 6/2008 | Frei | 358/3.26 |

FOREIGN PATENT DOCUMENTS

| | | |
|---|---|---|
| WO | 2013/006504 A2 | 1/2013 |
| WO | 2013/006504 A3 | 1/2013 |

OTHER PUBLICATIONS

International Search Report and Written Opinion received for PCT application No. PCT/US2012/045140, mailed on Dec. 18, 2012, 11 pages.
International Preliminary Report on Patentability received for PCT Patent Application No. PCT/US2012/045140, mailed on Jan. 16, 2014, 7 pages.

* cited by examiner

*Primary Examiner* — Gregory F Cunningham
(74) *Attorney, Agent, or Firm* — Jordan IP Law, LLC

(57) ABSTRACT

Systems and methods of blurring images may involve partitioning at least a portion of a non-separable finite impulse response (FIR) filter into a plurality of constant response sub-filters, wherein each constant response sub-filter has a rectangular aperture. In addition, the plurality of constant response sub-filters may be used to blur an image. In one example, the non-separable FIR filter may optionally be partitioned into one or more satellite sub-filters, wherein the one or more satellite sub-filters are also used to blur the image.

20 Claims, 3 Drawing Sheets

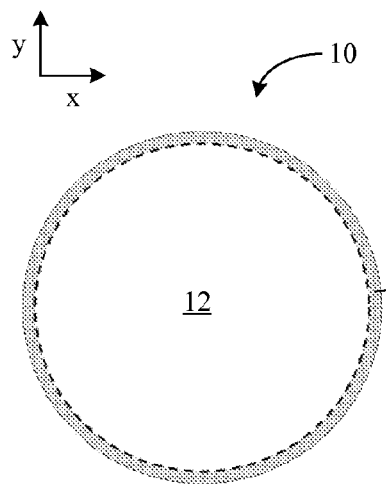
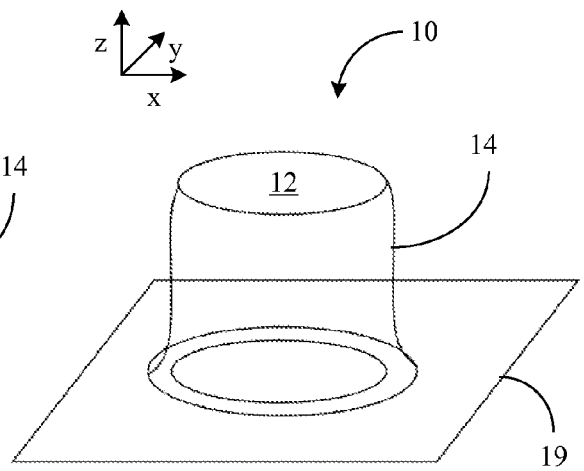
FIG. 1A  FIG. 1B
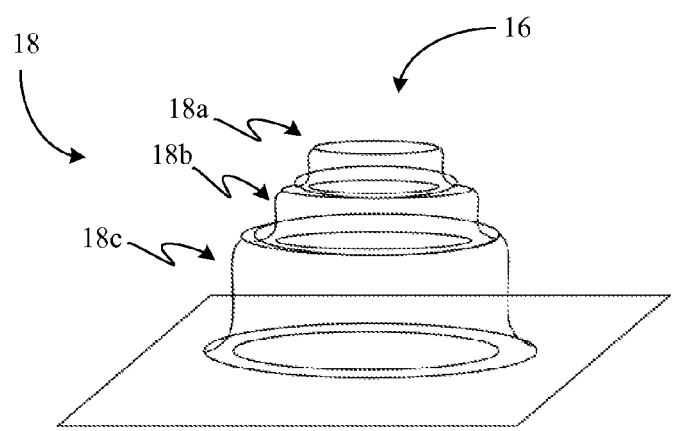
FIG. 2

IMAGE BLURRING BY PARTITIONING A NON-SEPARABLE FIR FILTER

BACKGROUND

Image processing applications may add special effects such as blurring to video frame data in order to simulate the natural blur process of a camera lens or the depth of field effect associated with the human visual system. One approach to image blurring may involve the application of a separable two-dimensional (2D) finite impulse response (FIR) filter to the pixels of the image to be blurred. In separable 2D FIR filtering, the blurring process may be conducted as a cascade of two one-dimensional (1D) FIR filters, where the first 1D filter can be applied to the rows of the input image, and the second 1D filter can be applied to the columns of the image output by the first filter. In particular, a rectangular aperture may be defined around each pixel to be processed, wherein the two 1D filters may be applied to the rows and columns falling within the rectangular aperture. While separable 2D filters may be suitable under certain circumstances, there remains considerable room for improvement. For example, the rectangular aperture of separable 2D filters may not adequately model the optical response of a camera lens or the human visual system, which are more circular or elliptical in nature.

BRIEF DESCRIPTION OF THE DRAWINGS

The various advantages of the embodiments of the present invention will become apparent to one skilled in the art by reading the following specification and appended claims, and by referencing the following drawings, in which:

FIG. 1A is a two-dimensional (2D) top view of an example of a finite impulse response (FIR) filter model having a substantially flat response profile according to an embodiment;

FIG. 1B is a three-dimensional (3D) perspective view of the FIR filter model shown in FIG. 1A;

FIG. 2 is a 3D perspective view of an example of a plurality of substantially flat filters that model an FIR filter having a substantially non-flat response profile according to an embodiment;

DETAILED DESCRIPTION

Figure 3:
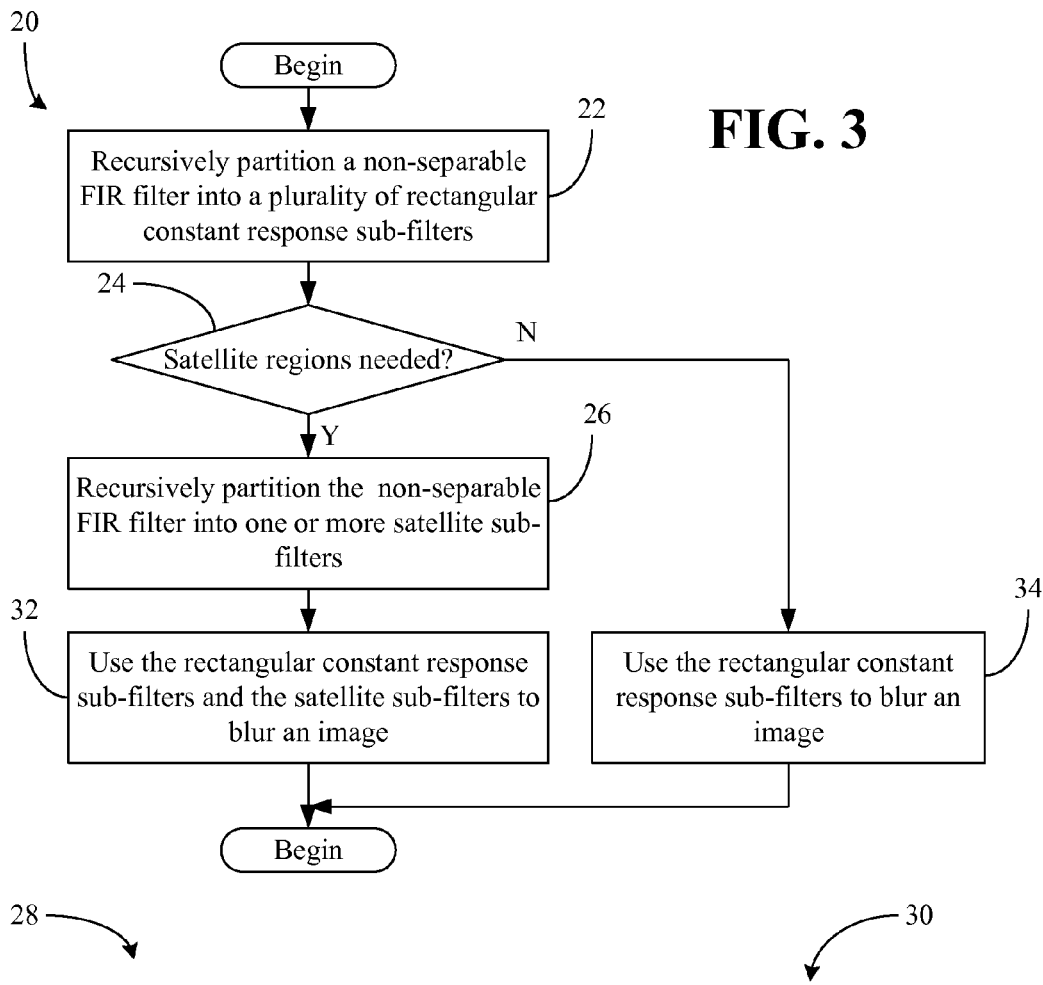
FIG. 3 is a flowchart of an example of a method of blurring an image according to an embodiment.

Embodiments may include a computer readable storage medium having a set of instructions which, if executed by a processor, cause a computer to partition at least a portion of a non-separable finite impulse response (FIR) filter into a plurality of constant response sub-filters, wherein each constant response sub-filter is to have a rectangular aperture. The instructions may also cause a computer to use the plurality of constant response sub-filters to blur an image.

Embodiments may also include a computing system having a processor and a set of instructions which, if executed by the processor, cause the computing system to partition at least a portion of a non-separable FIR filter into a plurality of constant response sub-filters, wherein each constant response sub-filter is to have a rectangular shape. The instructions may also cause the computing system to use the plurality of constant response sub-filters to blur an image.

Other embodiments can involve a computer implemented method in which a first portion of a non-separable FIR filter is partitioned into a plurality of constant response sub-filters, wherein each constant response sub-filter has a rectangular aperture. A second portion of the non-separable FIR filter may be partitioned into one or more satellite sub-filters. Additionally, one or more samples for the non-separable FIR filter can be set to zero to obtain an arbitrary shape for an aperture of the non-separable FIR filter, wherein the arbitrary shape includes at least one of a circular shape and an elliptical shape. The method may also provide for using the plurality of constant response sub-filters and the one or more satellite sub-filters to blur an image.

FIGS. 1A and 1B, show a model 10 of an arbitrarily-shaped FIR kernel/filter in which the x- and y-axes represent the 2D sampling lattice pixel neighborhood, and the z-axis represents the values of filter samples which collectively determine the amount of blur to be applied to the pixels of an image. The shape of the filter aperture (e.g., support region, filter profile, etc.) could be circular, elliptical, kidney-shaped, and so forth. In the illustrated example, the FIR filter includes a constant-value (e.g., constant response, flat, etc.) region 12 where all pixels are blurred with same-value filter samples, and a non-constant periphery band 14 where the filter samples taper off to a value of zero. Because the illustrated FIR filter has a substantially flat response profile, it might be considered a "mesa FIR filter" (e.g., termed after the shape of a mesa mountain). As will be discussed in greater detail, the circular aperture of the illustrated FIR filter enables the filter to simulate real world visual phenomena such as the optical response of a camera lens or the human visual system.

Turning now to FIG. 2, a model 16 of an FIR filter having a substantially non-flat profile is shown. In the illustrated example, the FIR filter is modeled as a plurality of substantially flat filters 18 (18a-18c). Thus, the illustrated class of 2D filter profile shapes can be approximated with a response that is constant by regions. Such an approximation might be considered a "rice-paddy" type of approximation that simplifies the well documented level set method of tracking interfaces and shapes. In particular, the plurality of flat filters 18 may be represented as a stack of r mesa FIR filter responses, which can approximate an arbitrary non-flat profile, wherein the approximation error may be made small by controlling the number of levels. For many applications, if a single mesa FIR filter is not sufficient, a rice-paddy type of filter with a limited number of levels (e.g., low r) may provide an adequate blur model that can be implemented at high speeds.

A convolution equation that defines the FIR filtering process may be represented as demonstrated in the following convolution equation, $$v(x, y) = \sum_{j=u1}^{u2} \sum_{i=l1}^{l2} h(i, j) u(x-i, y-j) \qquad (1)$$

where x, y, i and j are integers identifying rectangular grid locations, u and v are the input and output image pixel values, respectively, defined on a rectangular grid (e.g., sampling lattice), and h is the response of a non-separable FIR filter defined over a region inscribed within a grid rectangle (i.e., l1:l2, u1:u2). By selectively setting filter samples within the grid rectangle to zero, a filter aperture of arbitrary (e.g., non-rectangular) shape may be defined. Thus, in the mesa filter example above, the filter samples lying on a plane 19 (FIG. 1B) may be set to zero to obtain the circular aperture shown. The use of an FIR filter can be particularly beneficial for inscribing the filter aperture within the grid rectangle due to the finite response of the filter, Other aperture shapes such as elliptical shapes, etc., may also be achieved through such an approach.

In either the mesa example or the rice-paddy example, the constant-value portion of the FIR filter may be subdivided into rectangular sub-filters (e.g., a set of tiles), which are also constant in response value. The non-constant periphery bands may also be partitioned into one or more satellite sub-filters, wherein the plurality of constant response sub-filters and one or more satellite sub-filters can be applied to the pixel data in order to obtain a complete blurred image. A convolution equation to demonstrate such an approach may be expressed as follows, $$v(x, y) = \sum_{t=0}^{n-1} \sum_{j=u1}^{u2} \sum_{i=l1}^{l2} h_t(i, j) u(x-i, y-j) + \sum_{s=0}^{m-1} \sum_{j=u1}^{u2} \sum_{i=l1}^{l2} h_s(i, j) u(x-i, y-j) \quad (2)$$

where $h_t$'s are the constant response portion of the FIR filter representing the rectangular tile set (e.g., part of the FIR filter expressed as the constant-value rectangular kernel tiles), $h_s$'s are the non-constant response portion of the FIR filter representing the satellite regions (e.g., part of the FIR filter expressed as non-constant-value kernel satellites), n is the number of rectangular tiles and m is the number of satellite regions. Any filter aperture shape may be partitioned into the rectangular tile set and the satellite regions. Dropping the satellite contribution may produce an approximation of the original mesa response of equation (2), $$v(x, y) = \sum_{t=0}^{n-1} \sum_{j=u1}^{u2} \sum_{i=l1}^{l2} h'_t(i, j) u(x-i, y-j) \quad (3)$$

where the approximated response $h_t'(i,j)$ may differ from the original response $h_t(i,j)$ only by a common scaling factor s that can be used to match the collective response of the sub-filters corresponding to the rectangular tiles to the response of the original FIR filter. Thus, the relationship, $$h_t'(i,j) = s h(i,j) \quad (4)$$

may be computed as part of a "re-normalization" process so as to preserve the DC (direct current) filter response. As a result, the filtered (i.e., blurred) image may maintain the same perceived brightness level as the original for the filter approximation (e.g., rectangular filter tiles only) and the precise filter (e.g., rectangular tiles plus satellite regions). The decision of whether to drop the satellite contribution may be content dependent, wherein certain images, such as natural scenery, may be blurred using only the set of tiles without encountering an unacceptable level of error. In particular, the error due to satellite dropping may grow subjectively more insignificant as the amount of blur increases. Moreover, satellite dropping may provide significant speed and performance benefits.

FIG. 3 shows a method 20 of blurring an image. The method 20 may be implemented as a set of executable kernel/logic instructions stored in a machine- or computer-readable storage medium such as random access memory (RAM), read only memory (ROM), programmable ROM (PROM), flash memory, firmware, etc., in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method 20 may be written in any combination of one or more programming languages, including an object oriented programming language such as C++ or the like and conventional procedural programming languages, such as the "C" programming language or similar programming languages. Moreover, various aspects of the method 20 could be implemented as embedded logic of a graphics or other processor using any of the aforementioned circuit technologies.

Figure 4A:
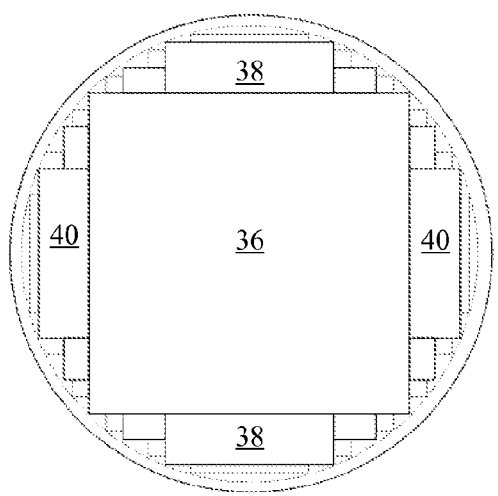
FIG. 4A is a 2D top view of an example of an arbitrarily-shaped non-separable FIR filter that is partitioned into a plurality of rectangular sub-filters and one or more satellite sub-filters according to an embodiment.
Figure 4B:
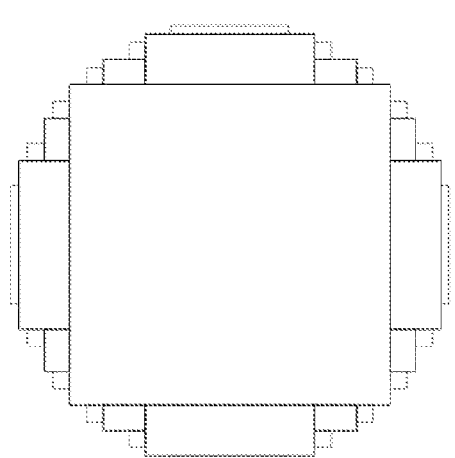
FIG. 4B is a 2D top view of an example of an arbitrarily-shaped FIR filter that is partitioned into a plurality of rectangular sub-filters according to an embodiment.

Processing block 22 provides for recursively partitioning of at least a portion of a non-separable FIR filter into a plurality of rectangular, constant response sub-filters. If it is determined from the image content at block 24 that the image blurring process should include the satellite sub-filters, illustrated block 26 partitions at least a portion of the non-separable FIR filter into one or more satellite sub-filters. FIG. 4A shows a partitioned non-separable FIR filter 28 that includes both rectangular constant response sub-filters and a satellite sub-filter, whereas FIG. 4B shows a partitioned non-separable FIR filter 30 that includes only rectangular constant response sub-filters. The illustrated tiling patterns may be generated through a recursive kernel partitioning algorithm (e.g., kernel partitioning by recursive tiling/KPRT) that uses a recursion level reaching a maximum value L as an exit condition, i.e. L=3 in the pseudo code below.

```
partition_satellite_set(Container<Region> satellite_set, int Recursion_level)
{
    Container<Region> loc_satellite_set; // empty!
    for each region in satellite_set
    {
        g_satellite_set -= region; // remove "region" from final satellite set
        partition_region_shape (Region& region) // func definition to partition a single Region
        {
            Point p = get_centroid_point_of (region);
            Rectangle rect = grow_balanced_rectangle_around (p);
            g_rect_tile_set += add_to_rect_tile_set(rect); // keep collecting rect tiles loc_satellite_set = region - rect; // create a satellite set as a set difference
```

```
            g_satellite_set += loc_satellite_set; // add new satellites to final set
            if (Recursion_level > L)
                exit;
            else
                partition_satellite_set (loc_satellite_set, Recursion_level++); //
recursive call!
            }
         }
      }
   }
   // ------------invocation -----------------------
   Region circle;
   Container<Region> region_set, g_satellite_set, g_rect_tile_set; // empty sets
   int recursion_level = 1; // initial value
   region_set += circle; // contains "circle" only
   partition_satellite_set(region_set, recursion_level);
```

Thus, the function call "partition_satellite_set" calls itself recursively until the recursion level exit condition is satisfied. The above pseudo code indicates one deterministic way of extracting a rectangular-shaped constant response sub-filter by growing the largest possible rectangle in a given region and balancing the rectangle around the centroid point of the region (e.g., "grow_balanced_rectangle_around (p)"). Other approaches to partitioning the FIR filter into rectangular-shaped constant response sub-filters may also be used.

Thus, with continuing reference to FIGS. 3, 4A and 4B, a first rectangle 36 may be created for the overall circular perimeter of the filter 28, then the smaller rectangles 38, 40 may be created in the remaining regions, and the process may be repeated until the recursion level exit condition is satisfied. The outputs of the filter partitioning process "g_rect_tile_set" and "g_satellite_set" may therefore be global container variables indicating the set of rectangular-shaped sub-filters and the set of satellite sub-filters, respectively.

The illustrated block 32 also provides for using the plurality of constant response sub-filters and the one or more satellite sub-filters to blur an image. Thus, block 32 might involve use of an equation such as equation (2), already discussed. The overall response of an arbitrarily-shaped FIR filter may therefore be the sum of responses of rectangular tile sub-filters and the responses of satellite sub-filters. The illustrated block 34, on the other hand, uses only the FIR filter applied as the rectangular tiles only to blur the image, wherein the filter application process may proceed as shown in equation (3).

The subdivision of at least a portion of the filters 28, 30 into constant-value rectangular tiles having minimal complexity without regard to tile size can significantly increase processing speed. In particular, the processing overhead cost of the responses in "g_rect_tile_set" may grow linearly with the number of n tiles in the set, which can be constrained by the recursion level parameter L. Moreover, the cost of the responses may grow at a much slower rate than the amount of blur (i.e., defined by the diameter for the circular aperture), wherein L can be set to a value based on the amount of blur such that a computational balance is obtained between the processing overhead cost of "g_rect_tile_set" and "g_satellite_set". For situations in which the FIR filter is approximated only by the set of rectangular tiles, the recursion level parameter L may be determined empirically as the smallest value that achieves a visually acceptable result.

For image data organized as single-precision (SP) float-value RGBA (red, green, blue, alpha) packed pixels, the techniques described herein may take advantage of single instruction multiple data (SIMD) architectures. For example, for a 16-byte SIMD width architecture, speed increases on the order of 4× may be experienced if pixels are operated on rather than independent R, G, B, A components (i.e., one pixel=four SP R, G, B, A values).

Figure 5:
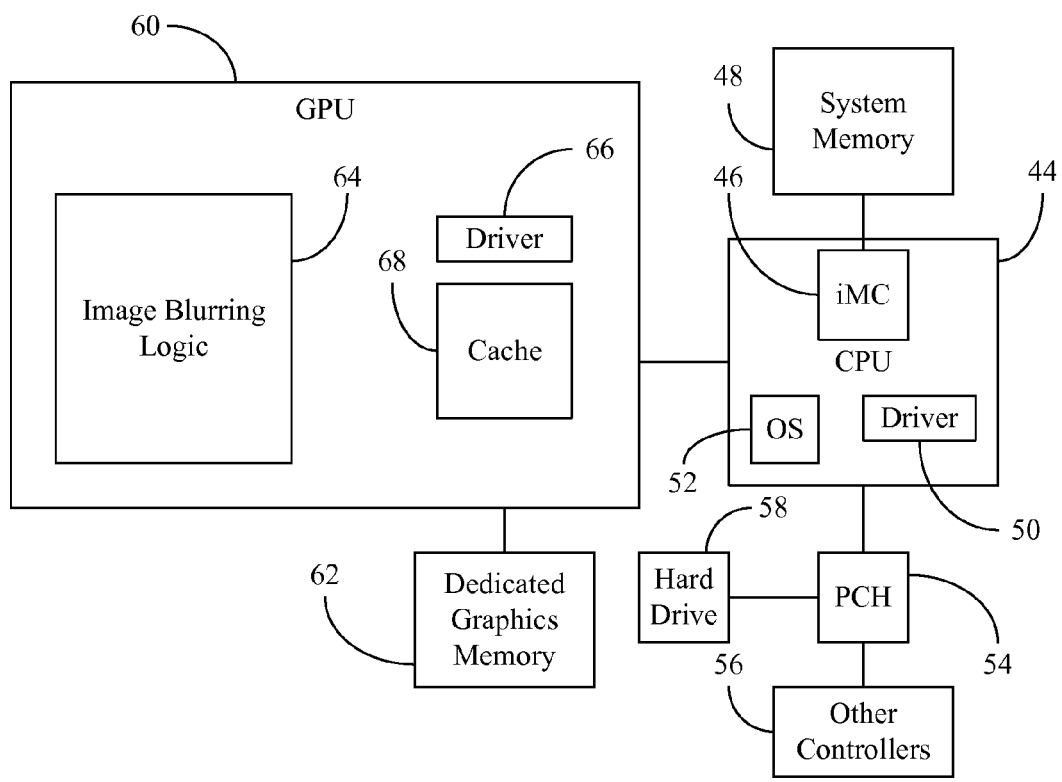
FIG. 5 is a block diagram of an example of a computing system according to an embodiment.

Turning now to FIG. 5, a computing system 42 is shown, wherein the system 42 may be part of a mobile platform such as a laptop, mobile Internet device (MID), personal digital assistant (PDA), media player, imaging device, etc., any smart device such as a smart phone, smart tablet, smart TV and so forth, or any combination thereof. The system 42 may also be part of a fixed platform such as a personal computer (PC), server, workstation, etc. The illustrated system 42 includes a central processing unit (CPU, e.g., main processor) 44 with an integrated memory controller (iMC) 46 that provides access to system memory 48, which could include, for example, double data rate (DDR) synchronous dynamic random access memory (SDRAM, e.g., DDR3 SDRAM JEDEC Standard JESD79-3C, April 2008) modules. The modules of the system memory 48 may be incorporated, for example, into a single inline memory module (SIMM), dual inline memory module (DIMM), small outline DIMM (SODIMM), and so on. The CPU 44 may also have one or more drivers 50 and/or processor cores (not shown), where each core may be fully functional with instruction fetch units, instruction decoders, level one (L1) cache, execution units, and so on. The CPU 44 could alternatively communicate with an off-chip variation of the iMC 46, also known as a Northbridge, via a front side bus or a point-to-point fabric that interconnects each of the components in the system 42. The CPU 44 may also execute an operating system (OS) 52 such as a Microsoft Windows, Linux, or Mac (Macintosh) OS.

The illustrated CPU 44 communicates with a platform controller hub (PCH) 54, also known as a Southbridge, via a hub bus. The iMC 46/CPU 44 and the PCH 54 are sometimes referred to as a chipset. The CPU 44 may also be operatively connected to a network (not shown) via a network port through the PCH 54 and various other controllers 56. Thus, the other controllers 56 could provide off-platform communication functionality for a wide variety of purposes such as wired communication or wireless communication including, but not limited to, cellular telephone (e.g., W-CDMA (UMTS), CDMA2000 (IS-856/IS-2000), etc.), Wi-Fi (e.g., IEEE 802.11, 2007 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The other controllers 56 could also communicate with the PCH 54 to provide support for user interface devices (not shown) such as a display, keypad, mouse, etc. in order to allow a user to interact with and perceive information from the system 42.

The PCH 54 may also have internal controllers such as USB (Universal Serial Bus, e.g., USB Specification 2.0, USB Implementers Forum), Serial ATA (SATA, e.g., SATA Rev. 3.0 Specification, May 27, 2009, SATA International Organization/SATA-IO), High Definition Audio, and other controllers. The illustrated PCH 54 is also coupled to storage, which may include a hard drive 58, read only memory (ROM), optical disk, flash memory (not shown), etc.

The illustrated system 42 also includes a dedicated graphics processing unit (GPU) 60 coupled to a dedicated graphics memory 62. The dedicated graphics memory 60 could include, for example, GDDR (graphics DDR) or DDR SDRAM modules, or any other memory technology suitable for supporting graphics rendering. The GPU 60 and graphics memory 62 might be installed on a graphics/video card, wherein the GPU 60 could communicate with the CPU 44 via a graphics bus such as a PCI Express Graphics (PEG, e.g., Peripheral Components Interconnect/PCI Express x16 Graphics 150W-ATX Specification 1.0, PCI Special Interest Group) bus, or Accelerated Graphics Port (e.g., AGP V3.0 Interface Specification, September 2002) bus. The graphics card may be integrated onto the system motherboard, into the main CPU 44 die, configured as a discrete card on the motherboard, etc. The GPU 60 may also execute one or more drivers 66, and may include an internal cache 68 to store instructions and other data.

The illustrated GPU 60 executes image blurring logic 64 (e.g., user space code) as part of a graphics application such as a motion picture special effects application, 3D (3-dimensional) computer game, flight simulator, or other imaging system, wherein the graphics application may involve blurring images. The illustrated image blurring logic 64 may be configured to partition at least a portion of a non-separable FIR filter into a plurality of constant response sub-filters, wherein each constant response sub-filter has a rectangular aperture. The logic can also be configured to use the plurality of constant value sub-filters to blur an image in real-time. In one example, one or more samples for the non-separable FIR filter are set to zero to obtain an arbitrary shape for an aperture of the non-separable FIR filter. By way of example, the arbitrary shape may have either a circular or elliptical (e.g., anamorphic) perimeter that simulates at least one of a camera lens and a visual system.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A computer implemented method comprising:
   partitioning a first portion of a non-separable finite impulse response (FIR) filter into a plurality of constant response sub-filters, wherein each constant response sub-filter has a rectangular aperture;
   partitioning a second portion of the non-separable FIR filter into one or more satellite sub-filters;
   setting one or more samples for the non-separable FIR filter to zero to obtain an arbitrary shape for an aperture of the non-separable FIR filter, wherein the arbitrary shape includes at least one of a circular shape and an elliptical shape; and
   using the plurality of constant response sub-filters and the one or more satellite sub-filters to blur an image.

2. The method of claim 1, wherein the non-separable FIR filter has a substantially constant response profile.

3. The method of claim 1, wherein the non-separable FIR filter has a substantially non-constant response profile and the method further includes:
   modeling the non-separable FIR filter as a plurality of non-separable FIR filters; and
   partitioning each of the plurality of non-separable FIR filters into a plurality of constant response sub-filters.

4. The method of claim 1, wherein the arbitrary shape simulates at least one of a camera lens and a human visual system.

5. A non-transitory computer readable storage medium comprising a set of instructions which, if executed by a processor, cause a computer to:
   partition at least a portion of a non-separable finite impulse response (FIR) filter into a plurality of constant response sub-filters, wherein each constant response sub-filter is to have a rectangular aperture; and
   use the plurality of constant response sub-filters to blur an image.

6. The medium of claim 5, wherein the instructions, if executed, cause a computer to:
   partition at least a portion of the non-separable FIR filter into one or more satellite sub-filters; and
   use the one or more satellite sub-filters to blur the image.

7. The medium of claim 5, wherein the non-separable FIR filter is to have a substantially constant response profile.

8. The medium of claim 5, wherein the non-separable FIR filter is to have a substantially non-constant response profile and the instructions, if executed, cause a computer to:
   model the non-separable FIR filter as a plurality of non-separable FIR filters; and
   partition at least a portion of each of the plurality of non-separable FIR filters into a plurality of constant response sub-filters.

9. The medium of claim 5, wherein the instructions, if executed, cause a computer to use a common scaling factor to match a collective response of the plurality of constant response sub-filters to a response of the non-separable FIR filter.

10. The medium of claim 5, wherein the instructions, if executed, cause a computer to set one or more samples for the non-separable FIR filter to zero to obtain an arbitrary shape for an aperture of the non-separable FIR filter.

11. The medium of claim 10, wherein the arbitrary shape is to include at least one of a circular shape and an elliptical shape.

12. The medium of claim 10, wherein the arbitrary shape is to simulate at least one of a camera lens and a human visual system.

13. A computing system comprising:
   a processor; and
   a computer readable storage medium including a set of instructions which, if executed by the processor, cause the computing system to:
      partition at least a portion of a non-separable finite impulse response (FIR) filter into a plurality of constant response sub-filters, wherein each constant response sub-filter is to have a rectangular shape, and
      use the plurality of constant response sub-filters to blur an image.

14. The computing system of claim 13, wherein the instructions, if executed, cause the computing system to:
   partition at least a portion of the non-separable FIR filter into one or more satellite sub-filters, and
   use the one or more satellite sub-filters to blur the image.

15. The computing system of claim 13, wherein the non-separable FIR filter is to have a substantially constant response profile.

16. The computing system of claim 13, wherein the non-separable FIR filter is to have a substantially non-constant response profile and the instructions, if executed, cause the computing system to:
   model the non-separable FIR filter as a plurality of non-separable FIR filters, and
   partition at least a portion of each of the plurality of non-separable FIR filters into a plurality of constant response sub-filters.

17. The computing system of claim 13, wherein the instructions, if executed, cause the computing system to use a common scaling factor to match a collective response of the plurality of constant response sub-filters to a response of the non-separable FIR filter.

18. The computing system of claim 13, wherein the instructions, if executed, cause the computing system to set one or more samples for the non-separable FIR filter to zero to obtain an arbitrary shape for an aperture of the non-separable FIR filter.

19. The computing system of claim 18, wherein the arbitrary shape is to include at least one of a circular shape and an elliptical shape.

20. The computing system of claim 18, wherein the arbitrary shape is to simulate at least one of a camera lens and a human visual system.

* * * * *